United States Patent [19]

Bachem et al.

[11] Patent Number: 5,082,527
[45] Date of Patent: Jan. 21, 1992

[54] NITROGEN-CONTAINING POLYMERIC COMPOUNDS

[75] Inventors: Henning Bachem, Cologne; Georg Schröder, Burscheid; Carlhans Süling, Odenthal; Jürgen Reiners, Leverkusen; Janos Muszik, Leverkusen; Dieter Arlt, Cologne; Manfred Jautelat, Burscheid; Wolf-Dieter Schröer, Munich, all of Fed. Rep. of Germany

[73] Assignee: Bayer Aktiengesellschaft, Leverkusen, Fed. Rep. of Germany

[21] Appl. No.: 323,457

[22] Filed: Mar. 14, 1989

[30] Foreign Application Priority Data

Mar. 26, 1988 [DE] Fed. Rep. of Germany ....... 3810424

[51] Int. Cl.$^5$ ............................................. D21H 13/20
[52] U.S. Cl. ............................. 162/164.3; 162/164.5; 162/164.6

[58] Field of Search ............... 162/164.3, 164.6, 164.5, 162/168.6, 168.2

[56] References Cited

U.S. PATENT DOCUMENTS 3,361,590  1/1968  Gaertner ........................ 162/164.3
3,893,885  7/1975  Ziemann et al. ................ 162/164.6

FOREIGN PATENT DOCUMENTS 0182653  5/1986  European Pat. Off. .
1165394  9/1969  United Kingdom .

Primary Examiner—Peter Chin
Attorney, Agent, or Firm—Sprung Horn Kramer & Woods

[57] ABSTRACT

Crosslinkable compounds obtainable by reaction of water-soluble mono- or polyamines with 2,3-epoxypropyl sulphonates or 2-hydroxypropyl 1,3-bis-sulphonates or their mixtures with up to 15 mol % of an epihalogenohydrin or dihalogenohydrin are used for imparting wet strength to paper.

8 Claims, No Drawings

NITROGEN-CONTAINING POLYMERIC COMPOUNDS

The invention relates to crosslinkable compounds which are obtainable by reaction of water-soluble mono- or polyamines with 2,3-epoxypropyl sulphonates or 2-hydroxypropyl 1,3-bis-sulphonates or their mixtures with up to 15 mol % of an epihalogenohydrin or dihalogenohydrin, their preparation and their use as auxiliaries in paper-making.

Crosslinkable reaction products of mono- or polyamines and an epihalogenohydrin or dihalogenohydrin and their use for imparting wet strength to paper are known.

Thus, for example, self-crosslinking, water-soluble reaction products of epihalogenohydrins and basic polyamidoamines or polyamines or mixtures thereof, an excess of epihalogenohydrin per equivalent of basic amino groups being used in each case, are described in U.S. Pat. Nos. 3,732,290, 4,336,835, 4,787,110, 3,311,594, 3,640,840, 4,487,884, 4,515,657, 4,605,709, 4,708,772, 2,926,154 and 3,332,901.

Water-soluble condensation products of ξ-caprolactam, polyamines, polyamidoamines and epichlorohydrin are known from U.S. Pat. No. 3,645,954.

Water-soluble curable resins are obtained by reaction of epichlorohydrin with ammonia and/or polyamines by the process of U.S. Pat. No. 3,655,506.

Water-soluble cationic vinyl polymers which are accessible by transamidation of polyacrylamide with polyamines and subsequent reaction with epichlorohydrin are also known from U.S. Pat. No. 3,507,847.

Water-soluble reaction products of polyethyleneimine and epichlorohydrin or dichlorohydrin are known from U.S. Pat. No. 3,520,774.

1.0 to 2.5 mol of epihalogenohydrin or dihalogenohydrin per mol of basic nitrogen in the mono- or polyamine are in general used for the synthesis of products of high industrial quality. The reaction products have a high content of halogenohydrin reactive groups. These ensure that sufficiently reactive crosslinkable products are obtained and the desired wet strength values of paper are in this way achieved.

When used as agents for imparting wet strength in papermaking, however, incomplete reaction with the cellulose fibre or self-crosslinking takes place, so that unreacted portions of the products pass into the effluent from the papermaking machines and contribute to pollution thereof with organically bonded halogen.

The object of the present invention was to prepare water-soluble storage-stable compounds which are cross-linkable in the neutral or alkaline pH range and contain only very small amounts, if any, of organically bonded halogen. By using suitable halogen-free cross-linking agents, stepwise or complete replacement of the epihalogenohydrin or dihalogenohydrin should be achieved.

It was furthermore the object of the present invention to achieve wet strengths on paper which correspond to those of the commercially available polyamine-epihalogenohydrin resins.

It has been found that halogen-free 2,3-epoxypropyl sulphonates or 2-hydroxypropyl 1,3-bis-sulphonates, if appropriate mixed with up to 15 mol % of epihalogenohydrin or dihalogenohydrin, are outstanding by suitable for building up water-soluble storage-stable cross-linkable polyamine resins.

The mono- and polyamines contain at least 1 primary or secondary amino group. The polyamines contain $\geq 2$ basic amino groups. They can contain tertiary amino, carboxamide, urea or hydroxyl groups.

Preferred water-soluble polymers according to the invention are obtainable by reaction of A) a water-soluble mono- or polyamine having primary, secondary and if appropriate tertiary amino, carboxamide, urea or hydroxyl groups or mixtures thereof with B) a 2,3-epoxypropyl sulphonate or 2-hydroxypropyl 1,3-bis-sulphonate or mixtures of these sulphonates with up to 15 mol % of epihalo-genohydrin or dihalogenohydrin, and if appropriate subsequent or simultaneous reaction with further mono- or poly-amine A) in a molar ratio of 0.75 to 3.5 mol of component B) per mol of basic nitrogen in component A).

Particularly preferred water-soluble crosslinkable compounds are obtainable by reaction of A1) a water-soluble mono- or polyamine of the formulae

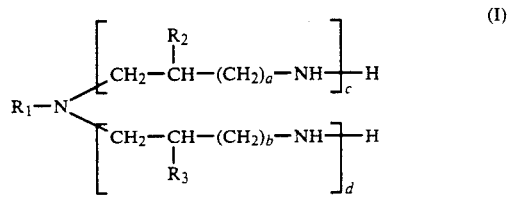

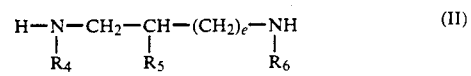

or

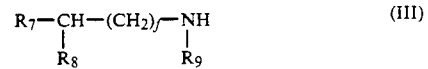

wherein $R_1$, $R_4$ and $R_6$ independently of one another stand for hydrogen or a $C_1$-$C_5$-alkyl radical which is optionally substituted by hydroxyl or amino, $R_2$, $R_3$, $R_5$ and $R_9$ independently of one another stand for hydrogen, methyl or ethyl, $R_7$ and $R_8$ independently of one another stand for hydrogen, hydroxyl or a $C_1$-$C_4$-alkyl radical which is optionally substituted by hydroxyl, a, b, e and f independently of one another stand for an integer from 0 to 4 and c and d independently of one another stand for an integer from 1 to 6, and/or 2) a polyalkylenepolyamine of the formula

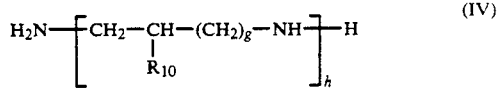

wherein $R_{10}$ stands for hydrogen or methyl, g stands for 0 or 1 and h stands for an integer from 14 to 2,500, and/or 3) a water-soluble polyamidoamine having a molecular weight of at least 800 and prepared from α) polyamines of the formula I or from mixtures of these polyamines with up to 50 mol % of diamines of the formula II and β) aliphatic or aromatic dicarboxylic acids having 2 to 12 atoms or functional derivatives thereof, such as anhydrides, esters, half-esters of amides, and/or γ) aminocarboxylic acids containing 3 to 6 C atoms or lactams thereof, and/or 4) a water-soluble polyurea containing secondary amino groups and/or 5) a polyalkyleneimine prepared by polymerization of 1,2-alkyleneimines with B) a 2,3-epoxypropyl sulphonate or 2-hydroxypropyl 1,3-bis-sulphonate of the formulae

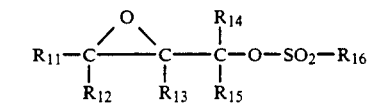  (V)

or

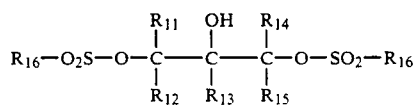  (VI)

wherein $R_{11}$, $R_{12}$, $R_{13}$, $R_{14}$ and $R_{15}$ independently of one another stand for hydrogen or an alkyl, cycloalkyl, aryl or aralkyl radical which is optionally substituted by alkoxy, cyano or carboxylic acid alkyl ester and $R_{16}$ stands for an alkyl or cycloalkyl radical or an aryl or aralkyl radical which is optionally substituted by hydroxyl, alkoxy, cyano, carboxamido, carboxylic acid alkyl ester or an optionally mono- or dialkylated amino group, and if appropriate simultaneous or subsequent reaction with another mono- or polyamine of the formulae (I) to (III) in a molar ratio of 0.75 to 3.5 mol of component B), preferably 0.8 to 3.0 mol, per mol of basic nitrogen in component A).

Of the starting components A), the compounds A1), A2) and A3) are preferred.

The preferred molar ratio of the amines A 3α) to the dicarboxylic acids A3β) is 0.8 to 1.4:1.

In the formulae (V) and (VI), preferably:

$R_{11}$–$R_{15}$ stand for hydrogen or a $C_1$–$C_8$-alkyl, $C_5$–$C_{12}$-cycloalkyl, phenyl, naphthyl or benzyl radical which is optionally substituted by $C_1$–$C_4$-alkoxy, cyano or carboxylic acid $C_1$–$C_4$-alkyl ester and $R_{16}$ stands for a $C_1$–$C_{16}$-alkyl or $C_5$–$C_{12}$-cycloalkyl radical or a phenyl, naphthyl or benzyl radical which is optionally substituted by hydroxyl, $C_1$–$C_4$-alkoxy, cyano, carboxamido, carboxylic acid $C_1$–$C_4$-alkyl ester or amino which is optionally substituted by 1 or 2 $C_1$–$C_4$-alkyl. Preferred sulphonates of the formulae (V) and (VI) have the formulae

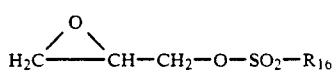  (VII)

and

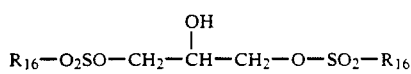  (VIII)

wherein $R_{16}$ has the abovementioned (preferred) meaning.

If water-soluble polyamines of the general formulae (I) or (II) are used as starting compounds and if $R_1$, $R_4$ and $R_6$ stand for hydrogen, the reaction products obtained are, in particular, the polymers according to the invention of the general formulae

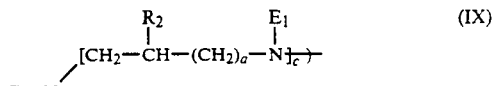  (IX)

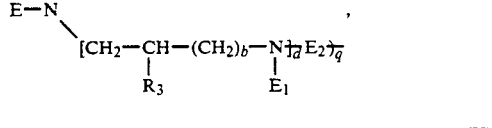  (X)

respectively, wherein $R_2$, $R_3$, $R_5$, a, b, c, d and e have the meaning given in the case of formulae (I) and (II), q denotes a number from 5 to 250, E and $E_1$ denote hydrogen or a group

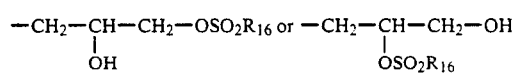

E also denotes $C_1$–$C_4$-alkyl and $E_2$ denotes a group

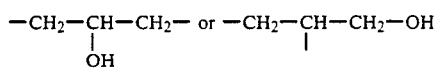

and $R_{16}$ has the abovementioned (preferred) meaning.

The meanings of $R_{16}$ which are to be mentioned in particular are $C_1$–$C_9$-alkyl, cyclohexyl or phenyl or benzyl which is optionally substituted by $C_1$–$C_4$-alkyl, $C_1$–$C_5$-alkoxy or hydroxyl.

If water-soluble polyamidoamines which are described under A3) and are prepared from the amines (I) and aliphatic dicarboxylic acids are used as starting compounds and if $R_1$ in I denotes hydrogen, the polymers according to the invention of the general formula

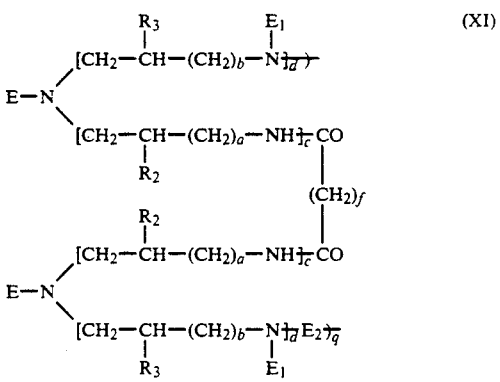  (XI)

wherein f stands for an integer from 0 to 10 and the other symbols have the abovementioned meaning, are obtained.

The polyamidoamines contain amino or carboxyl end groups, depending on the molar ratio of A3α: A3β.

If diamines II are additionally used as starting components, the polymers contain amide structures corresponding to the diamines II.

It is of course possible to use mixtures of the basic compounds A1) to A5) in the synthesis.

In addition to the recurring structural units shown in the general formulae (IX) to (XI), the structural units to be attributed to the mixed components mentioned then also arise in the polymer chains in the polymers according to the invention.

The crosslinkable compounds have, at a solids content of 5 to 30% by weight, preferably 10 to 25% by weight, a viscosity of 10 to 600 mPa.s, preferably 15 to 500 mPa.s, at 25° C. Their molecular weight is about 1,500 to 250,000, preferably 2,000 to 200,000 (weight average molecular weight).

The reaction products according to the invention are preferably prepared in an aqueous medium. It is also possible to use other polar solvents, such as methanol, ethanol, isopropanol, tert.-butanol, ethylene glycol, diethylene glycol, triethylene glycol, polyethylene glycol, glycerol, dimethylformamide or ethyl acetate or, preferably, mixtures thereof with water.

The reaction of starting components A and B is carried out by treatment of the aqueous or aqueous-organic approximately 10 to 60% strength solutions or emulsions of the two components at a temperature of 20° to 95° C., preferably 40° to 85° C., until a sample of the reaction mixture in the form of a 15% strength aqueous or aqueous-organic solution or emulsion has a viscosity of 15 to 300 mPa.s, preferably 20 to 200 mPa.s, at 25° C.

Thereafter, acids are added to the mixture, which is becoming more viscous, in order to end the action and to stabilize the self-crosslinking products, so that the pH is between 1 and 6, preferably 1.5 and 5.5.

Suitable stabilizing acids are in principle all the acids, and those which may be mentioned in particular are:

1. mineral acids or acid-reacting derivatives of these acids, such as amidosulphonic acid, sulphurous acid, silicic acid, boric acid, nitric acid, carbonic acid and, in particular, sulphuric, hydrochloric and phosphoric acid, 2. halogen-free mono- or polycarboxylic acids optionally containing hydroxyl groups or derivatives of these acids, such as acetic acid, acetic anhydride, propionic acid, oxalic acid, malonic acid, succinic acid, glutaric acid, adipic acid, maleic acid, lactic acid, tartaric acid, glycolic acid and, in particular, formic acid, malic acid and citric acid, and 3. halogen-free aliphatic or aromatic sulphonic acids, such as hydroxy-methanesulphonic acid cyclohexanesulphonic acid, alkane-sulphonic acids, the alkane radical of which contains 1 to 6 C atoms, benzylsulphonic acid, benzenesulphonic acid, 4-hydroxybenzenesulphonic acid and, in particular, methanesulphonic acid and toluenesulphonic acid (o, m and p), or mixtures thereof.

Acid derivatives are to be understood as acid-reacting derivatives of the abovementioned acids, in particular anhydrides and acid salts, such as, for example, hydrogen sulphates.

The solids content of the products is subsequently brought to the desired content by dilution with water and/or solvent.

Polyamines (I) which may be mentioned are: diethylenetriamine, triethylenetetramine, tetraethylenepentamine, pentaethylenehexamine, hexaethyleneheptamine, heptaethyleneoctamine, dipropylenetriamine, tripropylenetetramine, methyl-bis-(3-aminopropyl)-amine, ethyl-bis-(3-aminopropyl)-amine, 2-hydroxyethyl-bis-(3-aminopropyl)-amine, dihexamethylenetriamine or mixtures thereof.

Diamines (II) which may be mentioned are: ethylenediamine, N-(2-hydroxyethyl)-ethylenediamine, N,N'-dimethylethylenediamine, 1,2-diaminopropane, 1,3-diamino-propane, N-methyl-1,3-diaminopropane, N,N'-dimethyl-1,3-diaminopropane, N,N-dimethyl-1,3-diaminopropane or mix-tures thereof.

Monoamines (III) which may be mentioned are: methylamine, ethylamine, isopropylamine, butylamine, isobutylamine, dimethylamine, aminoethanol, 3-amino-1-propanol, 3-amino-2-propanol, 4-amino-1-butanol, 5-amino-1-pentanol, 6-amino-1-hexanol and isomers thereof, and mixtures thereof.

Polyalkylenepolyamines of the formula (IV) which may be mentioned in particular are:

a) the polyethylene-polyamine mixture which is obtained on discontinuous (for example Houben-Weyl, 4th edition, XI/1, page 44) or continuous (for example in British Patent Specification 1,147,984 or U.S. Pat. Nos. 1,832,534 and 2,049,467) reaction of 1,2-dichloroethane with aqueous ammonia, if appropriate in the presence of ethylenediamine, diethylenetriamine (U.S. Pat. No. 2,769,841 and U.S. Pat. No. 3,484,488. triethylenetetramine and is freed from ethylenediamine, diethylenetriamine, triethylenetetramine and tetraethylenepentamine by distillation, and b) the polybasic oligomeric amines which can be prepared by condensation of 1,2-dichloroethane with the polyethylenepoly-amines mentioned in a), individually or as a mixture, and have an average molecular weight of 1,000 to 10,000, preferably 2,000 to 5,000.

Examples of aliphatic polyamines (A3α) are mentioned in the case of the polyamines (I).

Preferred compounds are: diethylenetriamine, triethylenetetramine, tetraethylenepentamine, pentaethylenehexamine, hexaethyleneheptamine, dipropylenetriamine, methyl-bis-(3-aminopropyl)-amine, dihexamethylenetriamine or mixtures thereof, or mixtures thereof with 50 mol % of a diamine of the formula (II), preferably ethylenediamine.

Preferred dicarboxylic acids (A3α) are: oxalic acid, succinic acid, malonic acid, glutaric acid, adipic acid, sebacic acid, 1,12-dodecanedioic acid, itaconic acid, terephthalic acid and isophthalic acid or mixtures thereof.

The preferred compound (A3ρ) is ξ-caprolactam.

Compounds which may be mentioned as the polyurea (A4) are: reaction products of diisocynates and aliphatic polyfunctional amines, and reaction products of urea and polybasic amines, such as are described, for example, in German Offenlegungsschrift (German Published Specification) 2,925,567.

The preferred 1,2-alkyleneimine (A5) is ethyleneimine.

Preferred examples of 2,3-epoxypropyl sulphonates or 2-hydroxy-propyl 1,3-bis-sulphonates (B) are: 2,3-epoxypropyl 3-methylbenzenesulphonate, 2,3-epoxypropyl 2-methylbenzenesulphonate, 2,3-epoxypropyl ethanesulphonate, 2,3-epoxypropyl butanesulphonate, 2,3-epoxypropyl $C_1-C_6$-alkanesulphonate, 2,3-epoxypropyl cyclohexylsulphonate, 2-hydroxypropyl 1,3-dimethanesulphonate, 2-hydroxypropyl 1,3-di-(4-methylbenzenesulphonate), 2-hydroxypropyl 1,3-dibenzenesulphonate and in particular 2,3-epoxypropyl methanesulphonate, 2,3-epoxypropyl benzenesulphonate and 2,3-epoxypropyl 4-methylbenzenesulphonate.

Paper is treated with the polymers according to the invention in a manner which is known per se at pH values of 5 to 9. The crosslinkable compounds are preferably added in the form of aqueous solutions or emulsions to the aqueous suspensions of the paper raw material pulp; this is then further processed to paper.

The amounts added are between 0.4 and 4.0% by weight of the solution or emulsion (based on the paper pulp) with a content of polymer (active compound content) in each case of 10 to 20% by weight, depending on the desired effect. Even higher amounts are used for particularly high wet strength requirements. For example, amounts to be added of 6.0% by weight or more are necessary for laminated papers with a high ash content and low weight per unit area.

Clear, preferably aqueous cationic solutions or emulsions which are storage-stable for months, preferably 6 to 9 months, completely free from organically bonded adsorbable halogen or contain very small amounts and provide an outstanding improvement to the wet strength of paper treated with them are obtained in the manner described under industrially simple conditions which are easy to handle.

The polymers according to the invention differ from known polyamine/polyamidoamine reactive polymers in that the use of an epihalogenohydrin or epihalogenohydrin derivative has been completely or largely dispensed with during their preparation. In contrast to the resins known to date, which have a high content of halogenohydrin reactive groups, the resins according to the invention contain the groups of the formula

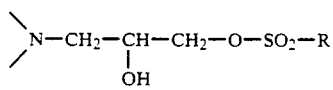

in which R can stand for a substituent as described for $R_{16}$, which are reactive towards the paper pulp.

EXAMPLE 1

50.0 g of 2,3-epoxypropyl methanesulphonate are added dropwise to an initial mixture of 120 g of a 50% strength aqueous solution of a polyamidoamine of U.S. Pat. No. 3,640,840, column 4, lines 35 to 51 and 300 ml of water at 30° C. in the course of 30 minutes, while stirring, and the mixture is subsequently stirred at 35° C. for 30 minutes.

It is then heated up to 60° to 70° C. and 400 ml of water are added, as the viscosity increases. As soon as the desired viscosity has been reached, the mixture is acidified to pH 3.0 by addition of a sulphuric acid solution.
Solids content: 15.0% by weight.
Viscosity: 34 mPa.s (25° C.).
Organic Cl content: 0.001% by weight.
Organic S content: 1.3% by weight.

EXAMPLE 2

61.0 g of 2,3-epoxypropyl methanesulphonate are added dropwise to an initial mixture of 120 g of a 50% strength aqueous solution of a polyamidoamine of U.S. Pat. No. 3,640,840, column 4, lines 35 to 51 and 350 ml of water at 30° C. in the course of 20 minutes, while stirring, and the mixture is subsequently stirred at 35° C. for 30 minutes.

The mixture is then heated to 70° C. and 450 ml of water and 15.0 g of methyl-bis-(3-aminopropyl)-amine are added, as the viscosity increases. When the desired viscosity is reached, the mixture is acidified to pH 2.8 by means of a sulphuric acid solution and the solids content is adjusted as desired.
Solids content: 15.0% by weight.
Viscosity: 28 mPa.s (25° C.).
Organic Cl content: 0.001% by weight.
Organic S content: 1.5% by weight.

EXAMPLE 3 a) 438 g of adipic acid and 169.5 g of ξ-caprolactam are added to an initial amount of 324 g of diethylenetriamine, while stirring; during this procedure, the internal temperature rises to about 100° C.

The mixture is then heated to 190° C. in the course of 3 hours, whereupon the water of reaction distils off uniformly, the mixture is then cooled to 150° C. and 800 ml of water are added.

The mixture is subsequently stirred at 80° to 90° C. for a further hour and then cooled.
Viscosity: 330 mPa.s (25° C.).
Solids content: 51.7% by weight.
Base equivalent weight: 436 g/equivalent of basic N (titrated).

b) 68.3 g of 2,3-epoxypropyl methanesulphonate are added dropwise to an initial mixture of 174 g of a precursor according to Example 3a) dissolved in water and 500 ml of water at 30° C. in the course of 30 minutes, while stirring, and the mixture is subsequently stirred at this temperature for 45 minutes.

The reaction mixture is then heated at 65° C. and diluted with 500 ml of water, as the viscosity increases.

When the desired viscosity has been reached, the mixture is acidified to pH 3.3 with the aid of formic acid solution and adjusted to the desired solids content.
Solids content: 15.0% by weight.
Viscosity: 119 mPa.s (25° C.).
Organic Cl content: 0.001% by weight.
Organic S content: 1.4% by weight.

EXAMPLE 4

71.8 g of 2,3-epoxypropyl 4-methyl-benzenesulphonate are added in portions to an initial mixture of 122 g of a 50% strength aqueous solution of a polyamidoamine of U.S. Pat. No. 3,640,840, column 4, lines 35 to 51 and 381 g of water at 25° C. in the course of 30 minutes.

The mixture is then stirred at 30° C. for 30 minutes and subsequently heated to 70° C.

This temperature is maintained and 581 ml of water are added continuously, as the viscosity increases.

When the desired viscosity is reached, the mixture is acidified to pH 3.0 by means of sulphuric acid solution and the solids content of the stable emulsion is adjusted as desired.
Solids content: 14.1% by weight.
Viscosity: 465 mPas/25° C.
Organic Cl content: <0.01% by weight.

USE EXAMPLE

Bleached pine sulphite pulp is beaten in a Holländer at a consistency of 2.5% to a Schopper-Riegler freeness of 38°. 100 g thereof are introduced into a glass beaker and diluted to 1 l with water.

2 or 4% by weight of the product according to the invention (15% by weight of solids), based on the fibre, are introduced into the glass beaker. After a stirring time of 3 minutes, sheets of paper with a weight per unit area of about 80 g/m2 are formed on a sheet-forming machine (Rapid-Köthen apparatus) with the contents of the glass beakers. The sheets of paper are dried at 90° C. for 6 minutes in vacuo under a pressure of 20 mm/Hg and after-heated at 110° C. in a drying cabinet for a further 15 minutes.

After conditioning, 5 test strips 1.5 cm wide are cut out of each sheet of paper and immersed in distilled water for 5 minutes. The wet strips are then clamped in a tensile testing machine and the wet breaking load is determined.

The results obtained are shown in the following table.

| Example | Wet breaking load (Newtons) Amount used | | |
|---|---|---|---|
|  | 2% | 4% | 6% |
| 1 | 10.3 | 13.8 | 17.7 |
| 2 | 10.4 | 14.2 | 16.9 |
| 3b | 9.5 | 13.0 | — |

We claim:

1. A method of imparting wet strength to paper formed from paper pulp comprising adding to the paper pulp a cross-linkable polymer containing a sulphonate group, which is obtained by reacting (A) (1) a water-soluble mono- or polyamine selected from the group consisting of mono- or polyamines having the formulae $$R_1-N\begin{bmatrix}[CH_2-CH(R_2)-(CH_2)_a-NH]_c-H\\ [CH_2-CH(R_3)-(CH_2)_b-NH]_d-H\end{bmatrix}$$

or $$R_7-CH(R_8)-(CH_2)_f-NH-R_9$$

wherein $R_1$, $R_4$ and $R_6$ independently represent a member selected from the group consisting of hydrogen, an unsubstituted $C_1$-$C_5$-alkyl radical, or a $C_1$-$C_5$-alkyl radical which is substituted by hydroxyl or amino, $R_2$, $R_3$, $R_5$ and $R_9$ independently represent a member selected from the group consisting of hydrogen, methyl or ethyl, $R_7$ and $R_8$ independently represent a member selected from the group consisting of hydrogen, hydroxyl, an unsubstituted $C_1$-$C_4$-alkyl radical, or a $C_1$-$C_4$-alkyl radical which is substituted by hydroxyl, a, b, e and f independently represent an integer selected from the group consisting of 0, 1, 2, 3 or 4, and c and d independently represent an integer selected from the group consisting of 1, 2, 3, 4, 5 or 6; and/or (A) (2) a polyalkylenepolyamine of the formula $$H_2N-[CH_2-CH(R_{10})-(CH_2)_g-NH]_h-$$

wherein $R_{10}$ represents a member selected from the group consisting of hydrogen or methyl, g represents an integer selected from the group consisting of 0 or 1, and h represents an integer selected from the group consisting of integers from 14 to 2,500; and/or (A) (3) a water-soluble polyamidoamine having a molecular weight of at least 800 and being prepared from (i) polyamines of the formula $$R_1-N\begin{bmatrix}[CH_2-CH(R_2)-(CH_2)_a-NH]_c-H\\ [CH_2-CH(R_3)-(CH_2)_b-NH]_d-H\end{bmatrix}$$

or from mixtures of these polyamines with up to 50 mole % of diamines of the formula $$H-N(R_4)-CH_2-CH(R_5)-(CH_2)_e-NH-R_6, \text{ and}$$

(ii) aliphatic or aromatic dicarboxylic acids having 2 to 12 atoms or functional derivatives thereof, and/or (iii) amino-carboxylic acids containing 3 to 6 atoms or lactams thereof; and/or (A) (4) a water-soluble polyurea containing secondary amino groups; and/or (A) (5) a polyalkyleneimine prepared by polymerization of 1,2-alkyleneimines; with (B) a 2,3-epoxypropyl sulphonate having the formula $$R_{11}-C(R_{12})-\overset{O}{\underset{}{\diagdown}}-C(R_{13})-C(R_{14})(R_{15})-O-SO_2-R_{16}$$

or a 2-hydroxypropyl 1,3-bis-sulphonate having the formula $$R_{16}-O_2S-O-C(R_{11})(R_{12})-C(OH)(R_{13})-C(R_{14})(R_{15})-O-SO_2-R_{16}$$

wherein $R_{11}$, $R_{12}$, $R_{13}$, $R_{14}$ and $R_{15}$ independently represent a member selected from the group consisting of hydrogen, or alkyl, cycloalkyl, aryl or aralkyl each of which is unsubstituted or substituted by alkoxy, cyano or a carboxylic acid alkyl ester, and $R_{16}$ represents a member selected from the group consisting of an alkyl, cycloalkyl, aryl or aralkyl radical which is unsubstituted or substituted by hydroxyl, alkoxy, cyano, carboxamido, a carboxylic acid ester, amino, a mono-alkyl amino group or a dialkyl amino group;

or mixtures of these sulphonates with up to 15 mol % of an epihalogenohydrin or dihalogenohydrin, in a molar ratio of 0.75 to 3.5 mol of component (B) per mol of basic nitrogen in component (A).

2. The method according to claim 1, wherein the crosslinkable polmer is obtained by reaction of 2,3-epoxypropyl sulphonates of the formula

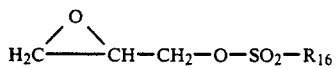

or 2-hydroxypropyl 1,3-bis-sulphonates of the formula

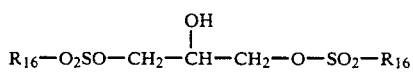

wherein $R_{16}$ represents a member selected from the group consisting of an alkyl, cycloalkyl, aryl or aralkyl radical which is unsubstituted or substituted by hydroxyl, alkoxy, cyano, carboxamido, a carboxylic acid ester, amino, a mono-alkyl amino group or a dialkyl amino group;

with up to 15 mol % of epichlorohydrin or dichlorohydrin.

3. The method according to claim 1, wherein the crosslinkable polymer is obtained by reaction of 2,3-epoxypropyl sulphonate, 2,3-epoxypropyl methanesulphonate, 2,3-epoxypropyl $C_1$-$C_6$-alkanesulphonate, 2,3-epoxypropyl cyclohexylsulphonate, 2,3-epoxypropyl benzenesulphonate or 2,3-epoxypropyl 4-methylbenzenesulphonate with up to 15 mol % of epichlorohydrin.

4. The method according to claim 1, wherein 5 to 30% strength by weight solutions or emulsions of the crosslinkable polymer have a viscosity of 10 to 600 mPa.s at 25° C.

5. The method according to claim 1, wherein the molecular weight of the crosslinkable polymer is 1,500 to 250,000.

6. The method according to claim 1, wherein in the preparation of the crosslinkable polymer, stabilizing acids or acid-reacting derivatives thereof are added.

7. The method according to claim 5, wherein the molecular weight of the crosslinkable polymer is 2,000 to 200,000.

8. The method according to claim 6, wherein the stabilizing acids or acid-reacting derivatives are selected from the group consisting of alkali metal hydrogen sulphates, amidosulphonic acid, sulphurous acid, nitric acid, sulphuric acid, hydrochloric acid, phosphoric acid, acetic acid, acetic anhydride, lactic acid, tartaric acid, formic acid, malic acid, citric acid, methanesulphonic acid, toluenesulphonic acid (o, m and p) and/or benzenesulphonic acid.

* * * * *